Feb. 23, 1943.  A. W. OEHLER  2,311,859

HITCH DEVICE

Original Filed June 30, 1939

INVENTOR
ALVIN W. OEHLER
BY
ATTORNEY

Patented Feb. 23, 1943

2,311,859

UNITED STATES PATENT OFFICE 2,311,859

HITCH DEVICE

Alvin W. Oehler, Moline, Ill., assignor to Deere & Company, Moline, Ill., a corporation of Illinois Original application June 30, 1939, Serial No. 282,026. Divided and this application June 30, 1941, Serial No. 400,388

3 Claims. (Cl. 280—33.4)

The present invention relates generally to hitch devices and more particularly to devices for hitching a trailing implement to a tractor in such a manner that the implement trails in laterally offset position with respect to the tractor or other draft device, so that the latter need not run over the ground immediately ahead of the implement. Devices of this type have their greatest application in connection with harvesting machines, such as windrowers or the like, having a structural frame disposed transversely of the line of travel with a cutter bar extending along the forward edge thereof and a platform behind the cutter bar with a conveyor for moving grain severed by the cutter bar. In order that the tractor does not need to travel ahead of the cutter bar and thus damage the standing grain, the implement is usually provided with a hitch member connected to the frame in laterally offset relation near one end thereof, the forward end of the hitch member being pivotally connected to the drawbar of the draft device or tractor.

It is well-known to those skilled in the art that the outer or grainward end of the platform has a tendency to lag behind due to the offset draft connection with the frame, and various means for maintaining the implement frame perpendicular to the direction of travel are known in the art.

It is the principal object of the present invention to provide means for preventing the outer end of the platform to lag behind, and thus to hold the platform in a position generally perpendicular with the direction of forward travel. In the accomplishment of this object, I have provided an auxiliary hitch member between the tractor and the implement frame, connected in offset relation to the main draft member and spaced laterally on the stubbleward side thereof. This auxiliary member is extensible and is provided with a spring for urging the member toward extended position and thus to impose a force acting rearwardly against the stubbleward extension of the implement frame beyond the point of connection of the main draft member, the spring action tending to force the grainward end of the platform forwardly into the proper operating position.

This application is a division of a co-pending application, Serial No. 282,026, filed June 30, 1939, by Ralph L. Anderson and myself.

Figure 1:
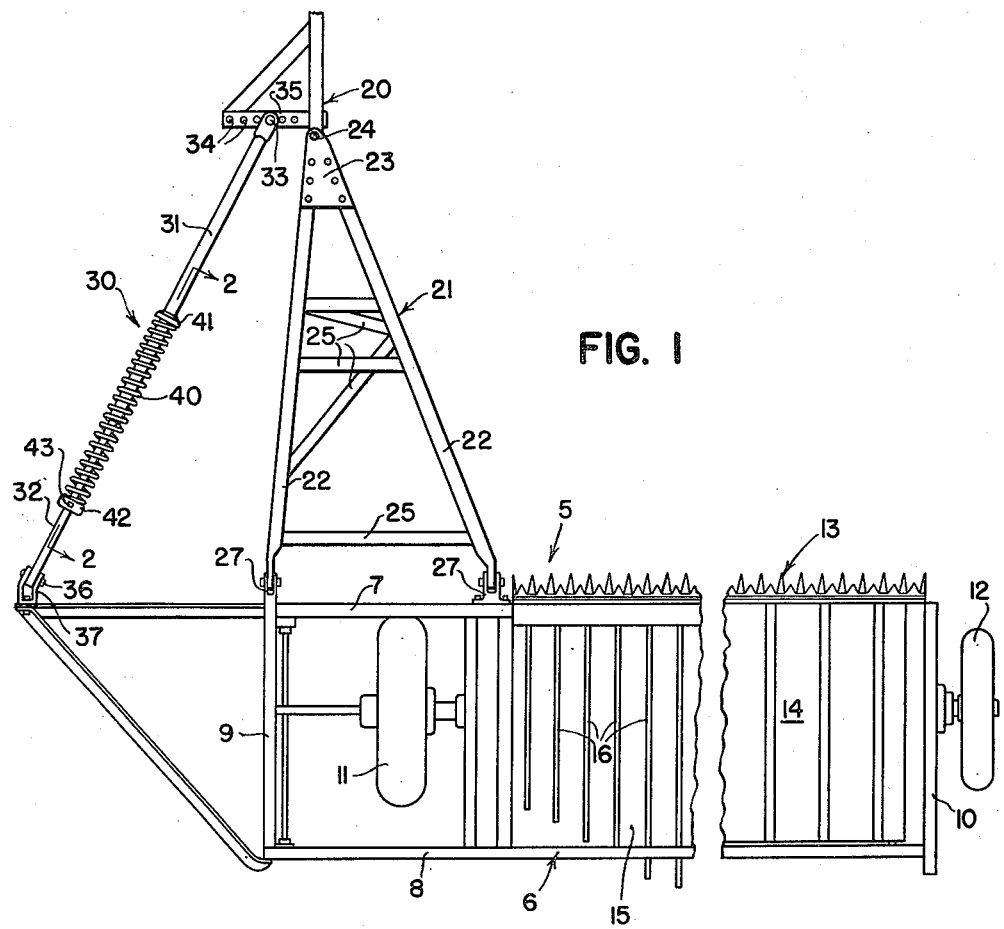
Figure 2:
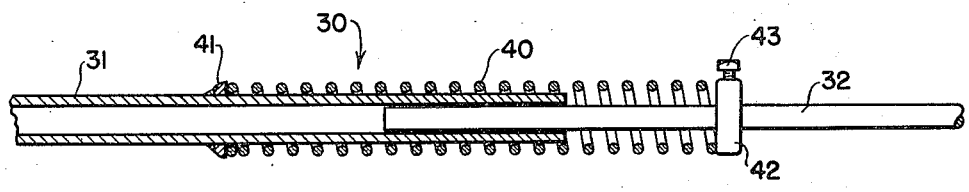

The foregoing and other objects and advantages of my invention will be apparent to those skilled in the art after a consideration of the following description in which reference is made to the drawing appended hereto, in which Figure 1 is a plan view of a windrower embodying the principles of my invention; and Figure 2 is a sectional view taken along a line 2—2 in Figure 1 and drawn to an enlarged scale.

Referring now to the drawing, the windrower, indicated in its entirety by reference numeral 5, comprises a transversely disposed platform frame 6 including front and rear transverse frame members 7, 8 interconnected by suitable longitudinally disposed frame members 9, 10, and carried on laterally spaced ground wheels 11, 12. A conventional cutter bar 13 extends transversely across the forward edge of the frame 6 and is driven by any suitable means (not shown) for severing the standing grain from the field and allowing the latter to fall upon a conventional canvas platform conveyor 14 behind the cutter bar 13. The conveyor 14 transports the harvested grain inwardly toward the stubbleward end of the platform and discharges the grain into a crop discharge opening 15 in the frame. A plurality of longitudinally disposed rods 16 are supported from the forward frame member 7 and extends rearwardly across the opening 15 for the purpose of pressing down the stubble and laying the harvested grain thereupon in a manner well-known to those skilled in the art.

The windrower is drawn by a tractor having a draft frame 20 and is connected with the windrower by means of a hitch member 21 comprising a pair of beams 22 connected together at their forward ends by a gusset plate 23 and extending rearwardly in diverging relation therefrom. The plate 23 is pivotally connected by means of a vertical bolt 24 to the tractor draft frame 20, providing for relative swinging movement of the tractor and the hitch member about the vertical axis of the bolt 24. The draft beams 22 are rigidly connected together by suitable cross braces 25 and the beams 22 are connected at their rear ends to the forward portion of the windrower frame 6 by means of a pair of transversely disposed coaxial pivot bolts 27, respectively, providing for vertical swinging movement of the hitch device 21 relative to the implement frame 6, but preventing relative lateral swinging movement thereof. The hitch device 21 is offset toward the stubbleward side of the windrower frame 6, so that the tractor does not run over the standing grain ahead of the cutter bar 13. This offset draft relation produces a tendency for the outer or grainward end of the platform to lag behind the inner end, swinging the implement about the draft bolt 24.

This tendency is counteracted by means of a bracing and aligning member 30 comprising a pair of telescoping members 31, 32. The forward member 31 is in the form of a tube, and is connected at its forward end by means of a pivot bolt 33 to one of a series of apertures 34 in a transversely disposed member 35 of the draft frame 20 of the tractor, the apertures 34 being in laterally offset relation with the pivot bolt 24 of the main hitch member 21. The other telescoping member 32 is in the form of a rod slidable within the tube 31 and connected at its rearward end by a generally transversely disposed pivot bolt 36 to a bracket 37 attached to the stubbleward end of the implement frame 6, extended in the stubbleward direction beyond the main hitch member 21. The pivot bolt 36 is disposed approximately coaxial with the pivot bolts 27 of the hitch member 21 so that the implement frame 6 can be adjusted about the axis of the supporting wheels 11, 12 in a manner well-known to those skilled in the art.

The bracing member 30 is urged toward extended position by means of a compression spring 40 in the form of a coil through which the members 31, 32 extend coaxially. One end of the spring 40 bears against a collar 41, secured as by welding, to the tubular member 31, and at its opposite end bears against an adjustable collar 42, which encircles the rod 32 and is slidable axially therealong. The collar 42 is secured in any desired position of adjustment by means of a set screw 43.

The set screw 43 is loosened before the implement is coupled to the tractor, the latter being accomplished by connecting the main hitch member 21 to the draft frame 20 by the pivot bolt 24 and by connecting the tubular member 31 to the transverse draft frame member 35 by the bolt 33. The tractor is then driven forwardly and turned sharply to the right relative to the hitch member 21, thus extending the telescoping members 31, 32, after which the collar 42 is moved up against the end of the spring 40 and secured to the rod 32 by tightening the set screw 43. Now when the tractor is driven forwardly, drawing the implement in a straight line, the draft frame member 35 is returned to its normal position, thus closing the telescoping members 31, 32 together and compressing the spring 40. The force of the spring in compression tends to force the stubbleward end of the implement frame rearwardly and thus to restrain the grainward end of the frame from lagging behind during forward operation. The effect of the spring 40 in holding the implement frame in transverse alignment can be adjusted by moving the collar 42 along the rod 32 and also by connecting the forward end of the tube 31 at a greater or less distance from the pivot bolt 24.

I claim:

1. In an implement comprising a transverse frame structure, a pair of laterally spaced supporting wheels therefor, and a hitch member extending forwardly therefrom and offset toward one end of said structure, means for pivotally connecting said hitch member to a draft device, and a bracing device extending forwardly from said frame structure and pivotally connected to said draft device at a point spaced laterally from said connection with said hitch member toward said one end of said structure, said bracing device including resilient means so constructed and arranged as to exert a continuously acting force urging the outer end of said frame structure forwardly to counteract the tendency of the latter to lag behind during forward travel of the implement and to yield to an increased turning moment between said implement and said draft device.

2. In an implement comprising a transverse frame structure, a pair of laterally spaced supporting wheels therefor, and a hitch member extending forwardly therefrom and offset toward one end of said structure, means for pivotally connecting said hitch member to a draft device, and a bracing device extending forwardly from said frame structure and pivotally connected to said draft device at a point spaced laterally from said connection with said hitch member toward said one end of said structure, said bracing device comprising a pair of telescoping members and spring means acting between the latter in a direction tending to extend said members for exerting a continuous force upon said frame structure counteracting the tendency of the outer end thereof to lag behind during forward travel of the implement.

3. In an implement comprising a transversely extending frame structure having ground engaging supporting means and a laterally rigid hitch member connected to said frame structure offset toward one end of the latter, means for pivotally connecting said hitch member to a tractor, a bracing member having one end connected to said frame structure at a point spaced laterally in a direction toward said one end of said frame structure from said hitch member, and means for pivotally connecting the opposite end of said bracing member to the tractor at a point spaced in the same direction from said pivot means, said bracing member being extensible and having spring means biased to normally exert a pressure tending to extend said bracing member for exerting a continuous force upon said frame structure counteracting the tendency of the outer end thereof to lag behind during forward travel of the implement.

ALVIN W. OEHLER.